United States Patent [19]

Campbell, Jr.

[11] Patent Number: 4,747,782

[45] Date of Patent: May 31, 1988

[54] COSMETIC SAMPLER

[75] Inventor: Gaines P. Campbell, Jr., Lookout Mountain, Tenn.

[73] Assignee: Arcade Inc., Chattanooga, Tenn.

[21] Appl. No.: 929,812

[22] Filed: Nov. 13, 1986

[51] Int. Cl.[4] .......... G09B 250/00

[52] U.S. Cl. .......... 434/377

[58] Field of Search .......... 434/377; 401/132

[56] References Cited

U.S. PATENT DOCUMENTS

| | | | |
|---|---|---|---|
| 2,362,367 | 11/1944 | Freeman | 434/377 |
| 2,961,342 | 11/1960 | Snyder . | |
| 3,276,899 | 10/1966 | Muhlberg et al. . | |
| 3,423,232 | 1/1969 | Reinhard et al. . | |
| 3,770,486 | 11/1973 | Hopermann . | |
| 4,218,155 | 8/1980 | Weidner | 401/132 |
| 4,372,098 | 2/1983 | Mason | 401/132 |

FOREIGN PATENT DOCUMENTS 019184 10/1985 European Pat. Off. .

*Primary Examiner*—Gregory E. McNeill
*Attorney, Agent, or Firm*—Stevens, Davis, Miller & Mosher

[57] ABSTRACT

A cosmetic sampler comprising, a folded flexible sheet wherein disposed on the inner faces of the folds are opposing strips of oleaginous barriers and disposed on one of the barriers is a cosmetic. The outer top portion of the folded product has means for exposing the cosmetic layer. The cosmetic can then be applied directly to skin, or removed from the sampler with a applicator and applied to skin.

32 Claims, 3 Drawing Sheets

FIG. 1
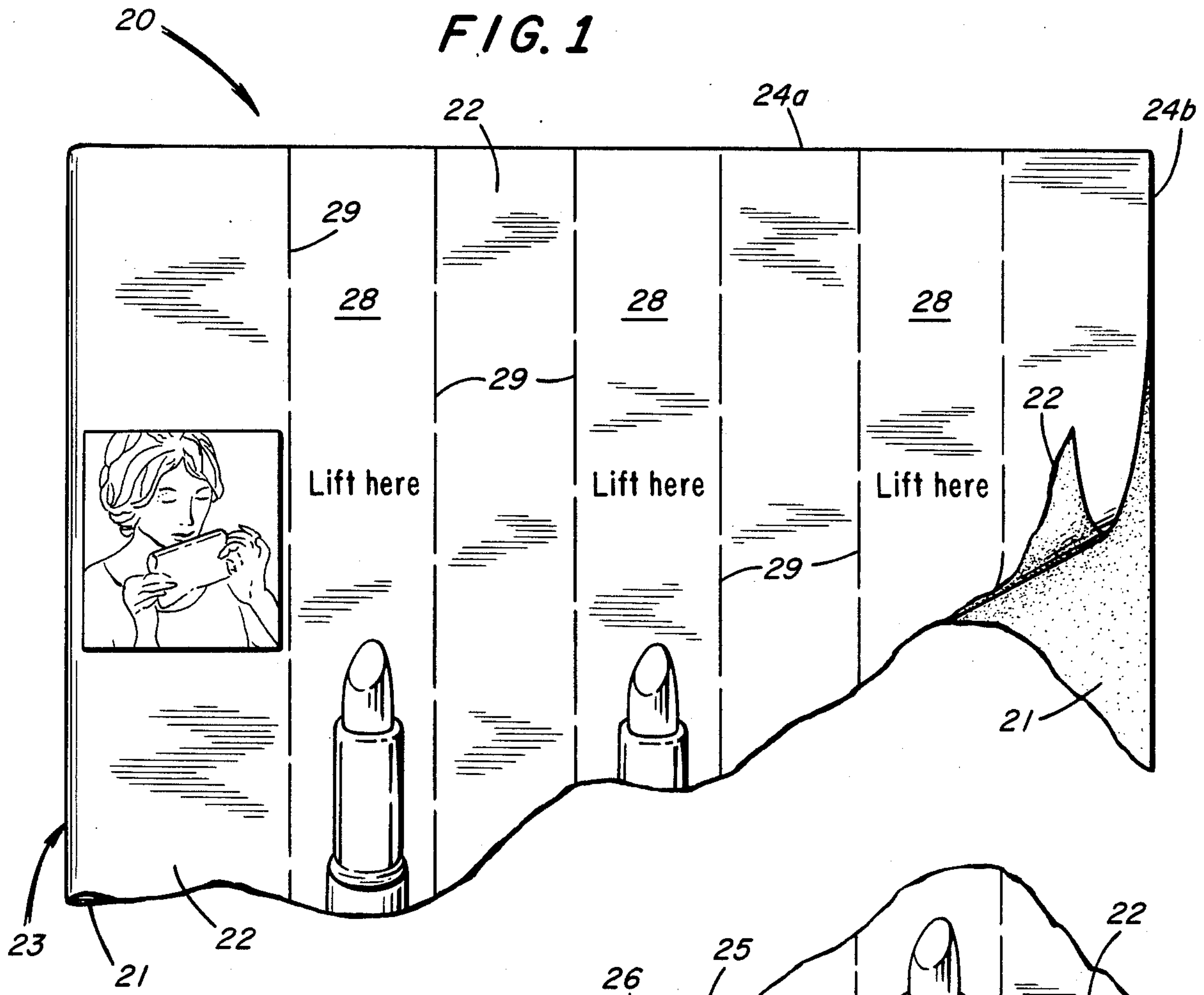
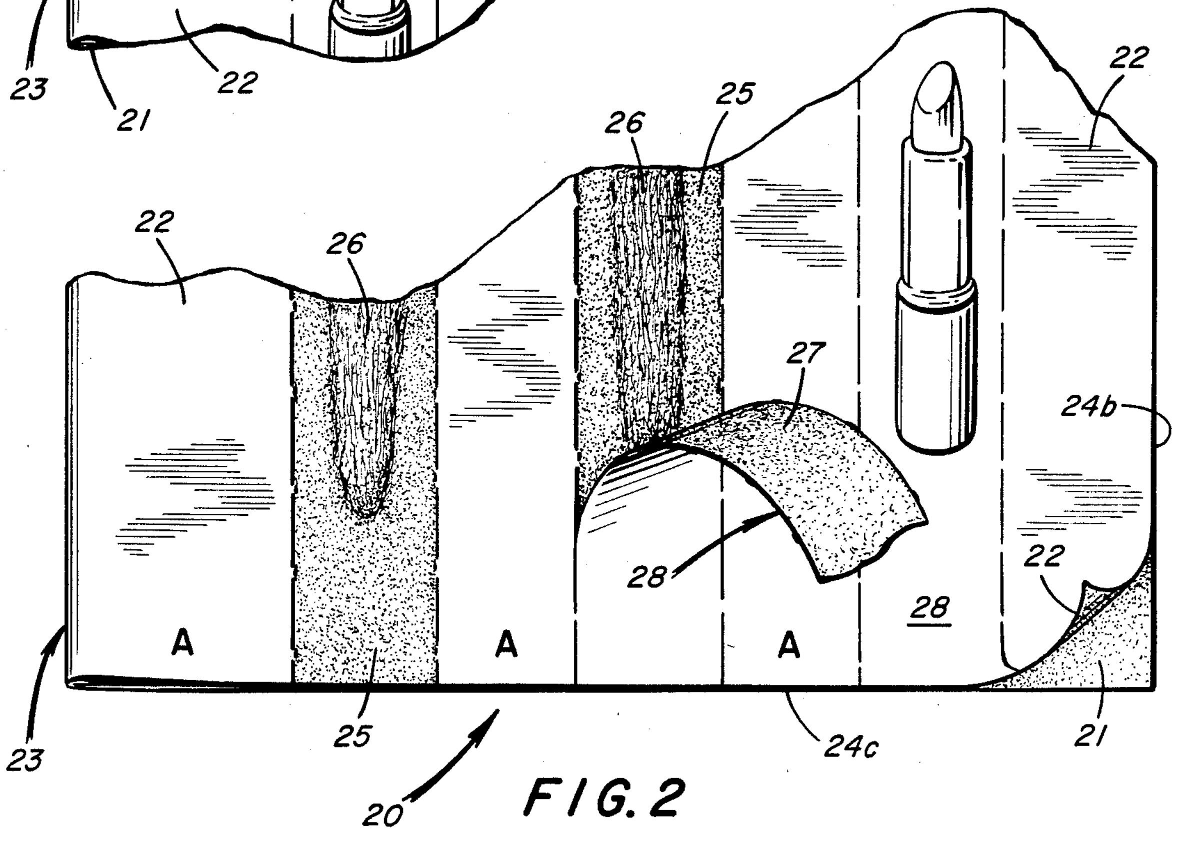
FIG. 2

COSMETIC SAMPLER

BACKGROUND OF THE INVENTION

1. Field of the Invention

This invention relates to a cosmetic sampler for use at a cosmetic counter or as an advertisement for cosmetics which can be placed directly in the mails or inserted into magazines, newspapers, catalogs or the like.

2. Description of the Prior Art

Brand-named cosmetics can and do become established products overnight. Such overnight success is of course created by the successful mass marketing of the goods. Television, radio and the printed media are all means through which millions of dollars are spent to "launch" a new product.

However, as reported in *Forbes*, "The Nose Knows", Jan. 13, 1986, page 280, market research shows that consumers are more likely to buy products they have sampled. The perfume industry has taken advantage of this knowledge and sends their fragrances to consumers for a personal trial by enclosing fragrances in individual fragrance samplers. The fragrance samplers are thin paper products that are folded. Between the folds are applied a mixture of glue and microcapsules containing scented oils. Pulling the folds apart ruptures the capsules and releases volatile oils. The product can then be rubbed on the skin to transfer the oil from the product to a consumer. Arcade Inc., the Assignee of the present invention, manufactures such fragrance samplers under the Trademark SCENTSTRIP.

Although perfumes are successfully marketed by such simple, cost effective samplers, no such simple device exists for the personal sampling of unadulterated oleaginous-based colored cosmetics such as eye shadows, blushes, mascaras, lipglosses, rouges and lipsticks which contain at least 30% oils, fats and/or waxes.

The prior art discloses packages which house oil-based products, or products containing oil. For instance, French Patent No. 2,422,562 discloses a product comprising a printed cover of folded leaves having rectangular pockets, consisting of aluminum coated with plastics. A cosmetic sample can be placed within the pockets.

U.S. Pat. No. 3,423,232 to Reinhard et al relates to oil resistant polyvinylidene coated paper bags which are suitable for packaging cosmetics.

Although the above disclosed devices can be used for marketing cosmetics, the devices are containers and bulky in comparison to the simple folded products used by the perfume industry as samplers.

The present invention satisfies the marketing needs of the cosmetic industry by making available a personal sampler that is inexpensive, easy to make and, is capable of holding small amounts of unadulterated oleaginous-based cosmetics that contain at least 30% oils, fats and/or waxes that can be removed and applied by the consumer.

SUMMARY OF THE INVENTION

The device of the instant invention contains a strip or a small sample of a oleaginous-based cosmetic which can be exposed and then applied to a consumer by means of a separate applicator or by means of the consumer's finger. In a particular embodiment the device can be used to apply the cosmetic. The oleaginous-based cosmetic is disposed on a barrier. Such a barrier is an organic polymer which has an affinity for the cosmetic but also prevents the oleaginous-based cosmetic from bleeding through the substrate supporting the barrier.

The term oleaginous-based cosmetic is defined as a cosmetic containing at least 30% of an oil, a fat and/or a wax. An oleaginous barrier is defined as a substance which will retain an oleaginous-based cosmetic without allowing the cosmetic to penetrate or seep through the barrier to a substrate.

One embodiment of the invention relates to a cosmetic sampler, comprising, a folded flexible sheet comprising a bottom fold and a top fold, the bottom fold and the top fold having opposing inner faces adhering to one another, each inner face having disposed thereon a oleaginous barrier, the barrier on the bottom fold having disposed thereon a oleaginous-based cosmetic as defined above opposing the barrier of the top fold and, the top fold having means for exposing said cosmetic.

Another embodiment of the invention relates to a cosmetic sampler comprising a folded flexible sheet comprising a bottom fold and a top fold, the bottom fold and the top fold having opposing inner faces, each inner face having disposed thereon an oleaginous barrier, the barrier on the bottom fold having disposed thereon an oleaginous-based cosmetic as defined above and a clear plastic removable strip such as of CELLOPHANE or SARAN. To expose the oleaginous-based cosmetic it is necessary only to remove the clear plastic strip.

Still another embodiment of the invention relates to a process for producing a cosmetic sampler, which comprises: (a) applying a first oleaginous barrier strip to a flexible sheet having a top and bottom face, the first oleaginous barrier strip being applied to a first portion of a top face of the flexible sheet; (b) applying a second oleaginous barrier strip to a second portion of the top face of the flexible sheet whereby the first and second barrier strips are parallel and separate; (c) heating the oleaginous barrier strips; (d) cooling the oleaginous barrier strips; (e) applying a strip of a oleaginous-based cosmetic to the first oleaginous barrier strip; (f) applying an adhesive to remaining portions of the top face of said flexible sheet not containing oleaginous barriers; (g) folding the flexible sheet so that adhesive applied portions adhere to one another; and (h) selectively scoring the folded bottom face of the second portion of the flexible sheet thereby creating a removable section on the second portion of the bottom face of the sheet to expose the oleaginous-based cosmetic.

BRIEF DESCRIPTION OF THE DRAWINGS

FIG. 1 shows a cosmetic sampler of the invention;

FIG. 2 shows the cosmetic sampler of FIG. 1 wherein the oleaginous-based cosmetic is exposed;

DESCRIPTION OF THE INVENTION

Figure 5:
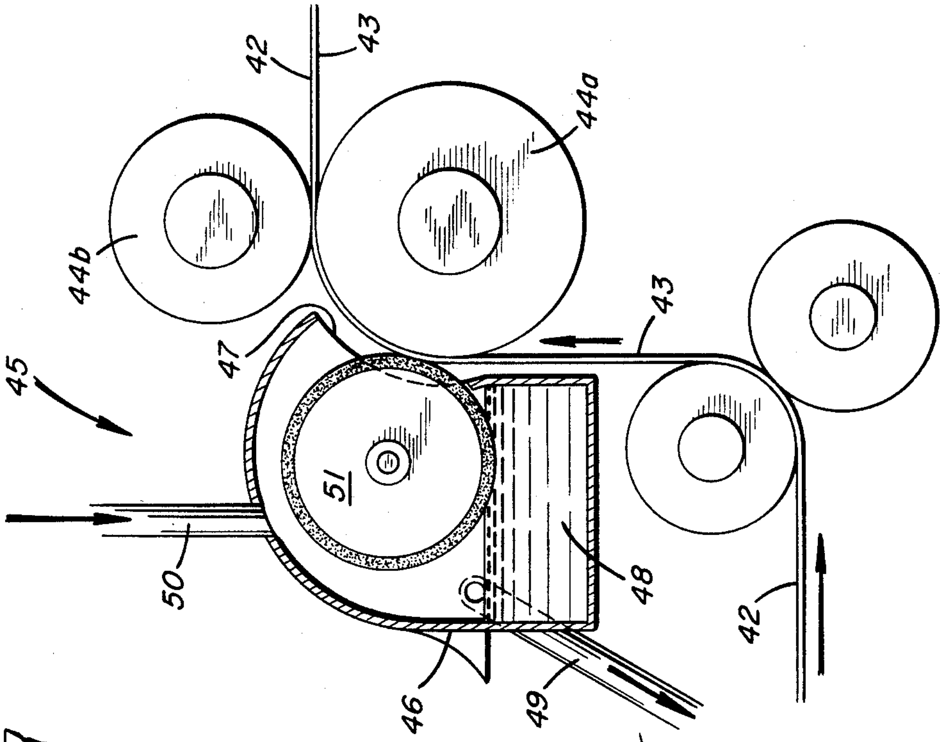
FIG. 5 shows a device for applying a oleaginous barrier to a flexible web.

FIGS. 1 and 2 show the cosmetic sampler of the invention. the sampler 20 is a folded flexible sheet having a bottom fold 21 and a top fold 22 a fold line 23 and edges 24*a*, *b* and *c*. Each of the folds 21 and 22 have an inner face and portions of the inner faces are adhered to one another by an adhesive not shown. The flexible sheet is preferably paper but equivalents include aluminum sheets, cellophane sheets, cardboard, polyethylene, and polypropylene sheets and the like. In addition to being flexible the sheet must be able to retain adhesives and the oleaginous barrier disclosed below.

Disposed on the inner face of bottom fold 21 is oleaginous barrier 25. The barrier is preferably polyvinylidene chloride but may be any organic polymer which can function as an oleaginous barrier. Suitable equivalents include polyvinyl chloride, cellophane, polypropylene, and polyethylene. In addition to being an oleaginous barrier the polymer must have a slight affinity for the oleaginous-based product. That is, the barrier must not only prevent the oleaginous-based cosmetic from bleeding through to the sheet material but also must prevent the oleaginous-based cosmetic from migrating off the barrier or dispersing along the barrier. At the same time the barrier must allow for the easy removal of the hydrocarbon-based cosmetic so that the cosmetic can be sampled by a consumer. Polyvinylidene chloride meets all of the above requirements.

Disposed on the oleaginous barrier is an oleaginous-based cosmetic 26.

The inner face of the top fold 22 of the sheet also has disposed thereon an oleaginous barrier 27 and the oleaginous barrier 27 opposes the oleaginous-based cosmetic 26 disposed on the oleaginous barrier 25 of the bottom fold 21. The two folds 21 and 22 are adhered to one another by an adhesive or glue applied to the inner face of the portions of fold 22 labled A. These portions of the inner face of fold 22 do not have oleaginous barriers. Of course, the inner face of fold 21 may alternatively have glue or adhesive applied thereto on portions of its inner face not having barrier 25.

The top fold 22 includes means 28 for exposing the underlying cosmetic layer. The means 28 includes intermittant score lines or intermittant slits 29.

On the top face of the top fold 22 the score lines 29 border the underlying oleaginous barrier. That is the intermittent score lines 29 are made on either side of the underlying barrier and run relatively parallel to the oleaginous barrier strips. Pulling on or lifting means 28 between the scored area removes means 28 and exposed the oleaginous-based cosmetic layer as shown in FIG. 2.

Figure 3:
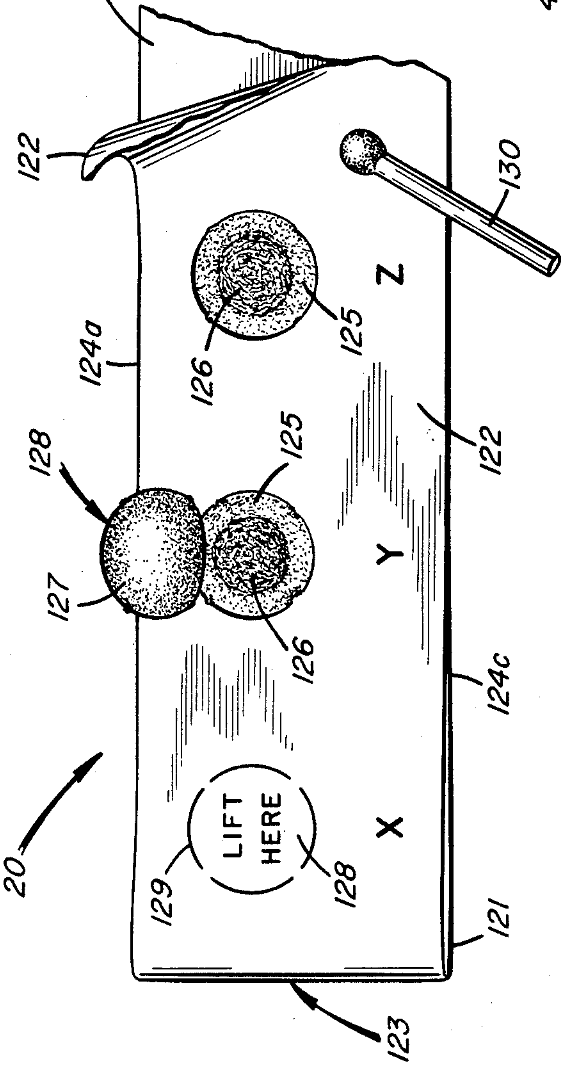
FIG. 3 shows a second embodiment of the invention wherein the oleaginous-based cosmetic is exposed.

The oleaginous barrier 25 may be applied to the inner face of fold 21 in strips as shown in FIG. 2 or in a circular pattern as shown in FIG. 3. The elements of FIG. 3 are similar to those of FIGS. 1 and 2. As shown in FIG. 3, two samples of cosmetic 126 are exposed, see samples Y and Z while sample X is shown with a pull tab 128 and score lines 129 intact.

The geometric configuration of the oleaginous-barrier can be any shape. The shape of the oleaginous-based cosmetic 126 disposed upon the oleaginous barrier 125 is dictated by the shape of the oleaginous barrier. That is, where the oleaginous barrier 25 is laid down as a strip the oleaginous-based cosmetic 26 is disposed as a somewhat smaller dimensional strip upon the oleaginous barrier as shown in FIG. 2. Where the oleaginous barrier layer 125 is circular, the oleaginous-based cosmetic 126 disposed thereon will have a slightly smaller circumference as shown in FIG. 3. Of course, the oleaginous barrier 127 will be of substantially the same dimensions and shape as oleaginous barrier 125. Barriers 125 and 127 sandwich the oleaginous-based cosmetic 126. The geometric pattern of oleaginous barrier 125 also dictates the shape of the means 128 for exposing the cosmetic 126. In FIG. 2 the means 28 takes on the shape of a tear strip; in FIG. 3 the means 128 is a circular pull tab.

The shape of the oleaginous barrier 25, 125 may be dictated by the type of oleaginous-based cosmetic applied thereto. For instance, blushes may be disposed on circular oleaginous barriers, eyeshadows on square barriers and, lipsticks on strip shaped barriers.

The cosmetic sampler shown in FIG. 1 is an ideal personal sampler for marketing lipstick. When lipstick is the oleaginous-based cosmetic 26 and the lipstick is exposed as shown in FIG. 2 the sampler can be bowed along the area defined by the removed tear strip. In this position the lipstick can be sampled directly by bringing the bowed sampler up to the lips and applying the cosmetic to the lips with gentle force. This is shown in the diagram on the sampler of FIG. 1. A small applicator 30 shown in FIG. 3, may be included with the sampler which can remove the cosmetic from the sampler and be used to apply the lipstick to the lips. Of course, blushes and eye shadows disposed on samplers are conveniently applied with such an applicator or applied with one's finger. The applicator may be a small nylon tipped device, having a plastic handle, a PVDC tipped device or any type of applicator now used in the cosmetic field.

The samplers described above can be used at a department store's cosmetic counter. The sampler used once may be disposed of. Such a sampler is cheaper and more sanitary than samplers used today. This is especially true of currently used lipstick samplers which are merely smaller versions of the actual stick dispensers. The lipstick in such dispensers is sampled by multiple consumers and no means short of removing the top layer of the lipstick is available for sanitizing the product. the sampler of the instant invention overcomes all of these limitations.

Additionally, the sampler can be made in the dimensions of a standard mailing envelope and shipped directly through the mails as a sampler. Alternatively, the sampler can be made to have any dimension and can be inserted in newspapers, magazines, catalogs or the like so that individual subscribers of such a publication can sample a cosmetic.

As shown in FIGS. 1 to 3 the sampler can be constructed so that an array of samples of a single cosmetic are available to a consumer. The sampler may contain a single color of a type of cosmetic such as a blush, eye shadow, lipstick or any other oleaginous-based cosmetic. Alternatively, a sampler can be constructed of such dimensions to accommodate an entire color line of a manufacturer's lipstick or other colored cosmetic. Of course, a sampler an contain a mix of products such as a blush, eye shadow or lipstick. The sampler can also be manufactured so that a single cosmetic sample can be exposed.

As is evident, and which is more fully described below, the cosmetic samplers described above are formed by starting with a flat web or sheet of flexible material and applying barrier strips to each half of the web or sheet. The cosmetic is then applied to the barrier strips on one half of the sheet or web and glue or adhesive is applied to portions of the web or sheet not covered by the barriers. The web or sheet is then folded so that the barriers sandwich the cosmetic. Thereafter, the top folds are scored to create means 28 for exposing the cosmetic sample.

Although the sampler disclosed above is a "folded" type of product, a sampler can be constructed so that it is more of a true "sandwich-type" of construction. That is, the cosmetic sampler may be composed of a flexible substrate having a top and a bottom face where an oleaginous barrier strip is disposed on the top face of the substrate. An oleaginous-based cosmetic having dimensions somewhat smaller than the barrier is applied to the barrier, and a flexible cover having a bottom face and a deposit of an oleaginous barrier disposed thereon is placed over the substrate so that the oleaginous barrier disposed on the cover overlays the cosmetic. The bottom face of the top of the cover is adhered to the top face of the substrate by applying an adhesive to the portion of the substrate not covered by the oleaginous-barrier thereon. The top face of the cover additionally has means for exposing the oleaginous-based cosmetic. The means may be in the form of a tear strip or similar device corresponding to the shape of the oleaginous-barriers, or the shape of the applied cosmetic.

Figure 4:
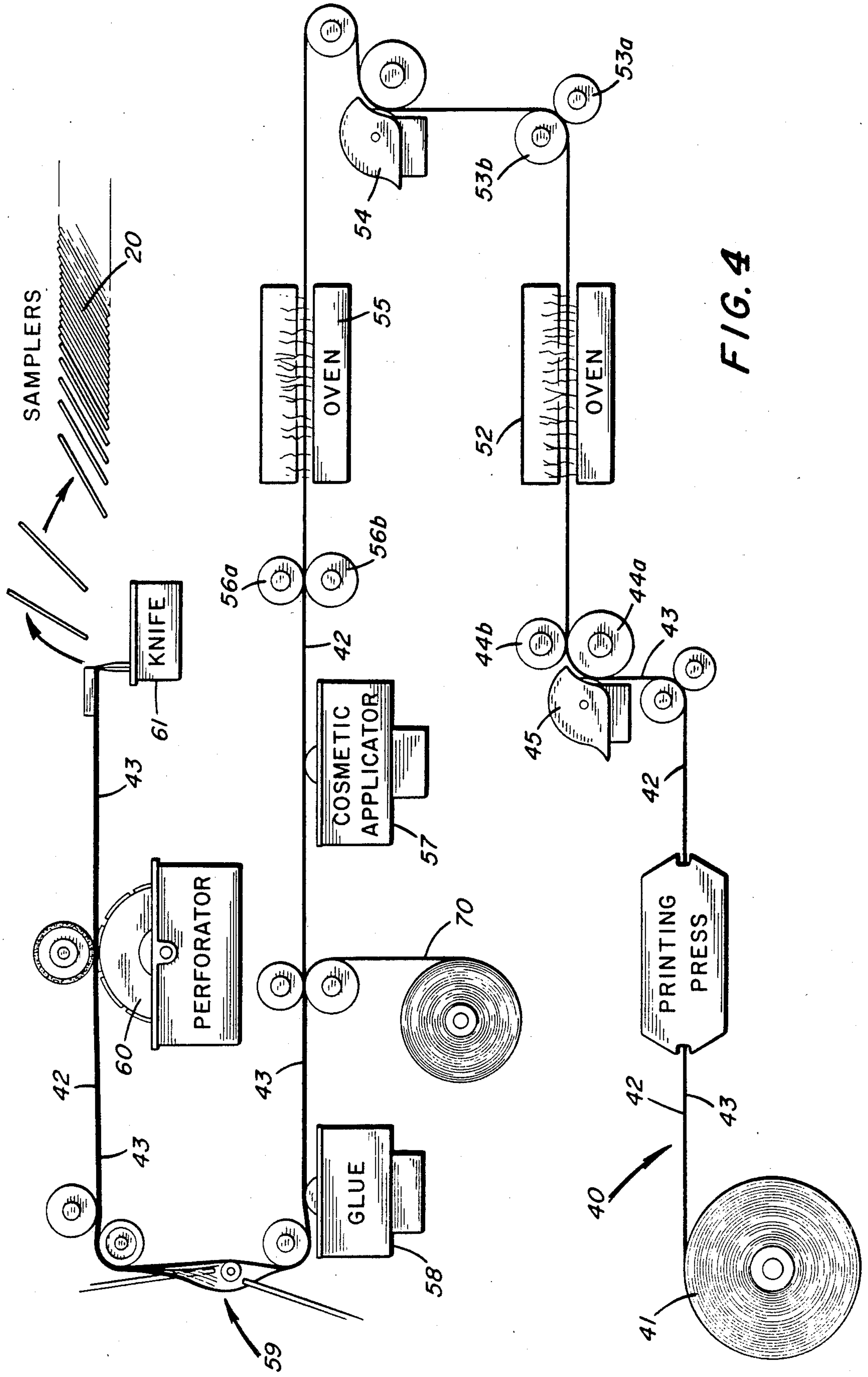
FIG. 4 is a diagrammatic elevational view of an apparatus for making the samplers of the invention.

FIGS. 4 and 5 are directed to a continuous process and equipment for manufacturing the cosmetic samplers of the invention.

As seen diagrammatically in FIG. 4 a web of flexible material 40, preferably paper, is drawn off supply rolls 41 by tension rolls not shown. The web has a barrier face 42 and a barrier-free face 43 and a longitudinal center, not shown, which divides the web into first and second portions. The web is conveyed to a four color printing press where a particular cosmetic manufacturer's logo, copy, or additional advertising or information about the product is applied thereto. Printed matter is usually applied to the barrier-free face 43 of the web 40 but ink may be applied to the barrier face. The web 40, on exit from the press is passed between drive tension and directional rollers 44*a* and *b*.

To the web 40 conveyed between rollers 44*a* and *b* separated oleaginous barriers are applied to face 42 of the web 40 on either side of the longitudinal center line by applicator means 45.

The oleaginous barrier layer is preferably polyvinylidene chloride (PVDC) or an equivalent product such as ethylene vinyl alcohol (EVA). The PVDC is extruded onto first and second portions of the top face of the web, or sprayed onto the web or applied by pressure application by means of a kiss roll type apparatus. The PVDC barrier is applied as an emulsion. The emulsion comprises a terpolymer of vinylidene chloride, methyl methacrylate and acrylic acid. The terpolymer is constituted of about 10 ppm of vinylidene chloride, 100 ppm of methyl methacrylate and 10 ppm of acrylic acid. The emulsion comprisesa about 55% of total solids, has pH of about 2, a freezing point of 36° F. and a flash point of 212° F. The latex properties also include excellent mechanical stability, a viscosity of 75 cps and a surface tension of 60 dynes/cm. Particle sizes range from 0.10–0.14 microns and the latex weighs 10.4 lbs. per gallon. A supplier of the PVDC emulsion is W. R. Grace & Co. or an equivalent product. The product is sold under the trade name DARAN 8600. After the barrier is applied it is heated to cure, and water is driven off by the heat.

The applicator means 45 shown in FIG. 4 and in greater detail in FIG. 5 is a kiss roll type liquid applicator. As seen in FIGS. 4 and 5 the applicator comprises a housing 46 having a concave open front surface 47, which conforms to the convex shape of roll 44*a*. The apparatus has a well 48 for storing the polymer emulsion an overflow cavity 49 in the side of the housing 46, and a supply line 50 for feeding the emulsion to the well 48. A kiss roll 51 is rotatably suspended between the sides of the housing 46 so that the bottom of the roll 51 is positioned just below the top of the well 48 and the overflow cavity 49 in the side of the applicator is positioned just above the bottom of the roll 51. Additionally, the front of the roll 51 is positioned across the width of the open face of the apparatus. The supply line 50 feed emulsion to the well 48 and the emulsion is absorbed onto the kiss roll 51. Excess PVDC emulsion fed to the well is drained via overflow cavity 49. The kiss roll 51 contacts the first and second portions of the top face 42 of the flexible web and deposits a strip of the PVDC oleaginous barrier on each portion of the web. The kiss roll applicator can be constructed so that more than one strip of the PVDC oleaginous barrier is deposited on a portion of face 42 of the web 40, the additional second strips being deposited simultaneously with the original strips. These arrays of strips are deposited parallel to the longitudinal center of the web. When arrays of strips are simultaneously deposited the kiss roll applicator means may be as wide as the moving web of flexible material 40 which may be about 33 cm, wide (13 inches). (However, the width of the flexible web is not critical and therefore may vary for a particular purpose. This is true for all dimensions given. The strips are deposited in approximately 1.9 cm widths ($\frac{3}{4}$ inch).

After the strips are deposited the web with strips is conveyed to a forced hot air oven 52 wherein the barrier strips are cured. The air temperature is approximately 285° F. and the web temperature is raised to approximately 235° F.

The heated web with strips moves out of the oven 52 and between chill rolls 53*a* and *b* to set the oleaginous PVDC barrier strips. The web can then be conveyed to the oleaginous-based cosmetic applicator 57 or to barrier applicator 54 where barrier strips can be applied directly over or superimposed on the already deposited barrier strips. Where the second application of PVDC is applied it can be done by a PVDC kiss roll type applicator extruding or spraying. Superimposed strips advantageously cover any pin-hole type aberrations appearing in the originally deposited strips. After the second deposition of oleaginous PVDC barrier strips the flexible web is conveyed to forced air oven 55 similar to oven 52 and through chill rolls 56*a* and *b* similar to chill rolls 53*a* and *b* to respectively cure and set the oleaginous PVDC barrier strips.

After the oleaginous PVDC barrier strips are cured and set an oleaginous-based cosmetic is applied to the barrier strip or array of barrier strips on the first portion of face 42 of the moving web 40.

The cosmetic is applied by cosmetic applicator 57.

The cosmetic applicator may consist of a device which holds a solid stick of the cosmetic over the barrier strips of the first portion of the moving web and, when pressed onto the strips of the moving web the cosmetic is transferred to the oleaginous barrier strips. Alternatively and preferably the cosmetic is heated to its melting temperature which is approximately between 120° F. and 170° F. and sprayed as a liquid onto the moving web. The cosmetic is sprayed so that a strip of oleaginous-based cosmetic of about 0.005 to 0.015 inches thick is deposited onto a barrier of the web. The strip is cosmetic is applied approximately on the center of the oleaginous barrier strips and its width is smaller than the width of the oleaginous barrier strip. The oleaginous barrier is about 0.004 to 0.006 inches thick.

The lipstick sets immediately and needs no further treatment.

Thereafter the web is moved to glue applicator 58 wherein a glue or adhesive is applied to the face 42 of the remaining portions of the web not covered by the barrier strips. For convenience and to minimize waste the adhesive may be applied to only the first portion of face 42 of the web not covered by barrier strips. Not only is glue or an adhesive applied between the barriers but the edges of the web also receive glue.

The web is then conveyed over roller-folder 59 so hat the web is folded on its longitudinal center causing the barrier strips or array of strips on the second portion of the web to overlay the oleaginous-based cosmetic strip or strips on the barrier strip or array of strips on the first portion of face 42 of the web. This folding causes the face portions to adhere to one another and exposes the barrier-free face 43 of the web to additional processing.

The folded web is then conveyed to perforator 60 where score lines are selectively made in the barrier-free face 43 of the folded second portion of the web to create means for exposing the oleaginous-based cosmetic layer.

The term "selectively scoring" means scoring face 43 of the second portion of the web parallel to and along the sides of the oleaginous barrier strip or array of strips deposited on the face 42 of the second position of the web 40. In this manner the tear strips 28 or scored sections similar to those shown in FIG. 1 are created. Of course the score or cut made is not continuous but is intermittant so that a pull force must be exerted to remove the section from the strip from the web.

After selective scores are made on the web, the web is conveyed to separating knife 61 where cuts are made at fixed intervals transverse to the direction of the moving web or transverse to the longitudinal center of the web thereby creating individual cosmetic samplers as shown in FIG. 1.

Figure 6:
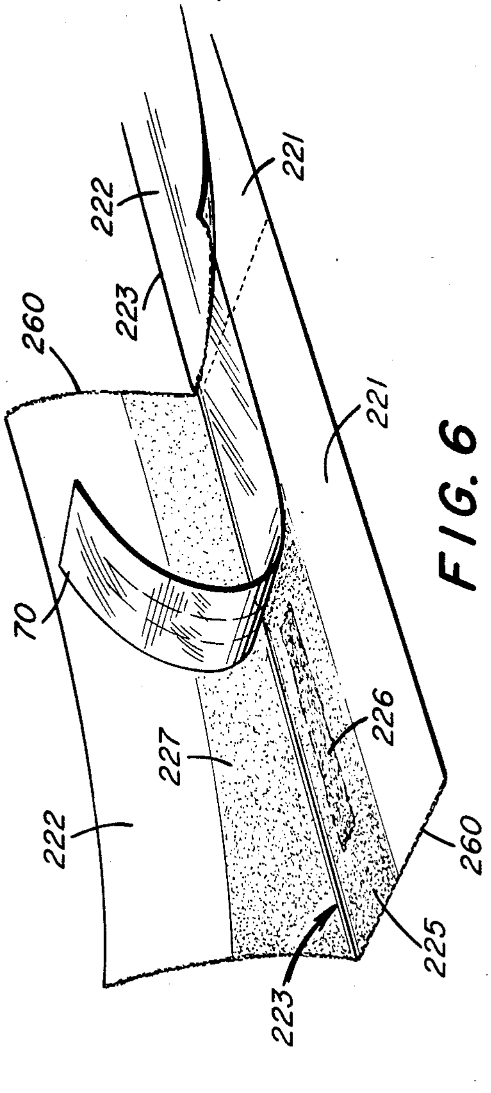
FIG. 6 shows a third embodiment of the invention.

As a further folded sampler embodiment, shown in FIG. 6, the sampler is formed from a flat web folded at 223 to form a bottom fold 221 and a top fold 222. On the bottom and top folds are barrier strips 225 and 222 respectively. A cosmetic strip 226 is placed on the bottom fold 221 with a clear plastic strip thereover. The clear plastic strip 70 has a tendency to adhere to the cosmetic strip but still permits being stripped from the cosmetic strip while at the same time preventing any bleeding of the cosmetic. Selective scores 260 extend transversely of the folds 221 and 222 so that individual samplers may be separated from the web. With the clear transparent plastic strip, the consumer can view the cosmetic without removing a strip cover.

If reference is made to FIG. 4, the clear plastic strip is applied after the cosmetic has been applied to the barrier face 42. With use of the clear plastic strip 70 the application of glue is omitted. The resultant product is a printed, folded advertisement containing an easily accessible sanitary cosmetic for sampling by the consumer.

The samplers created are approximately 16.5 cms wide ($6\frac{1}{2}$ inches) one half the width of a moving web, and 16.5 cms long. Generally, the web travels through the process steps at 500 ft/min. and therefore a transverse cut made by separating knife 60 is made every $6.4\times10^{-2}$ secs. This time represents the fixed interval disclosed above. Of course, the web could be moved faster or slower and the lengths of the samplers could be increased or decreased. If so, a fixed interval may be a function of web speed or product length or a combination of both and a fixed interval is defined accordingly.

Although a continuous process has been described for producing the samplers of the invention, the samplers can be made individually with individual sheets of a flexible substrate. Such a process for producing a cosmetic sampler having a plurality of cosmetic samples, may comprise fabricating a sampler by a batch process. This process includes applying a first array of parallel and separated oleaginous barrier strips to a first portion of a top face of a flexible sheet and applying a second array of parallel separated oleaginous barrier strips to a second portion of the flexible sheet. The barriers are heated and cooled. Thereafter, a corresponding array of oleaginous-based cosmetic strips are superimposed over the first array of oleaginous barrier strips. Next a adhesive is applied to the remaining portions of the top face of said flexible sheet; and the flexible sheet is folded so that the adhesive applied to the remaining portions causes the portions of the flexible sheet to adhere to one another and exposes the bottom face to further processing. The folded second portion of the flexible sheet is scored thereby enabling the bottom face of the portions of the bottom face to be removed to expose the array of cosmetic strips. As disclosed in the first embodiment a sandwich structure can also be fabricated in this manner. In such an embodiment the barriers if deposited in strips need not be parallel to the longitudinal center of the flexible sheet.

Although the invention has been described in detail with respect to its construction, operation and usefulness, the present disclosure of the invention is presented as an example and changes in the cosmetic sampler and the process for making the cosmetic sampler may be resorted to without departing from the spirit and scope of the invention as claimed below.

I claim:

1. A cosmetic sampler, comprising a folded flexible sheet, penetrable by an oleaginous substance, comprising a bottom fold and a top fold, said bottom fold and said top fold having at least portions of opposing inner faces adhering to one another, each inner face having disposed thereon on an oleaginous barrier, said barrier on said bottom fold having disposed thereon an oleaginous-based cosmetic containing at least 30% of oils, fats and/or waves opposing the barrier of said top fold and said top fold having perforations for exposing said cosmetic on either side of said oleaginous barrier.

2. The cosmetic sampler of claim 1, wherein said folded sheet is paper.

3. The cosmetic sampler of claim 1, wherein said oleaginous barriers are polyvinylidene chloride.

4. The cosmetic sample of claim 1, wherein said oleaginous barriers are ethylene vinyl alcohol copolymer.

5. A cosmetic sampling kit, comprising, the cosmetic sample of claim 1 and an applicator for removing exposed cosmetic from said sampler and for applying said cosmetic to skin.

6. The cosmetic sampler of claim 1 wherein said oleaginous barriers are strips.

7. A cosmetic sampler, comprising:

a flexible flat substrate, penetrable by an oleaginous substance, having a top and a bottom face;

a strip of an oleaginous barrier disposed on said top face of said flat substrate;

a strip of an oleaginous-based cosmetic disposed on said barrier;

a flexible flat cover, penetrable by an oleaginous substance, having a top and bottom face, said flexible flat cover having a strip of an oleaginous barrier on its bottom face opposing said oleaginous-based cosmetic of said flexible flat substrate, said bottom face of said flexible flat cover having portions thereof surrounding said cosmetic adhering to portions of said top face of said flexible flat substrate and said top face of said flexible flat cover having perforations extending longitudinally and on either side of said oleaginous barrier for exposing said cosmetic.

8. A cosmetic sampler, comprising:

a folded sheet, penetrable by an oleaginous substance, comprising a fold line, three edges, a bottom fold and a top fold;

said bottom fold and said top fold having opposing inner faces with each inner face having disposed thereon an array of parallel, separated strips of oleaginous barriers, said arrays opposing one another;

an array of strips of an oleaginous-based cosmetic correspondingly disposed on said bottom array of barrier strips and opposing said top array of barrier strips, said opposing inner faces adhering to one another along said fold line, said edges and between said barrier strips; and said top fold having perforations for exposing said oleaginous-based cosmetic on either side of said oleaginous barrier.

9. A cosmetic sampling kit, comprising the cosmetic sampler of claim 8 and an applicator for removing exposed oleaginous-based cosmetic from said sampler and for applying said cosmetic to skin.

10. The cosmetic sampler of claim 8 wherein said oleaginous barrier strips and said oleaginous-based cosmetic strips are parallel to said fold line of said folded sheet.

11. A cosmetic sampler, comprising a folded flexible sheet, penetrable by an oleaginous substance, comprising a bottom fold and a top fold, said bottom fold and said top fold having opposing inner faces with each inner face having disposed thereon an oleaginous barrier strip, said barrier strip on said bottom fold having disposed thereon an oleaginous-based cosmetic strip containing at least 30% oils, fats and/or waxes and a clear plastic strip thereover opposing the barrier of said top fold, said top fold having perforations for exposing said cosmetic on either side of said oleaginous barrier strip.

12. The cosmetic sampler of claim 11, wherein said folded sheet is paper.

13. The cosmetic sampler of claim 11, wherein said oleaginous barriers are polyvinylidene chloride.

14. The cosmetic sampler of claim 11, wherein said oleaginous barriers are ethylene vinyl alcohol copolymer.

15. A cosmetic sampling kit comprising the cosmetic sampler of claim 11, and an applicator for removing exposed cosmetic from said sampler and for applying said cosmetic to skin.

16. A process for producing a cosmetic sampler, which comprises:

(a) applying a first oleaginous barrier strip to a flexible sheet having a top and bottom face, said first oleaginous barrier strip being applied to a first portion of a top face of the flexible sheet;

(b) applying a second oleaginous barrier strip to a second portion of said top face of said flexible sheet whereby sad first and second barrier strips are parallel and separate;

(c) heating said oleaginous barrier strips;

(d) cooling said oleaginous barrier strips;

(e) applying a strip of an oleaginous-based cosmetic to said first oleaginous barrier strip;

(f) applying an adhesive to remaining portions of said top face of said flexible sheet not containing oleaginous barriers;

(g) folding said flexible sheet so that adhesive applied portions adhere to one another; and (h) selectively scoring the folded bottom face of said second portion of said flexible sheet thereby creating a removable section on the second portion of said bottom face of said sheet to expose said oleaginous-based cosmetic.

17. The process of claim 16 wherein said oleaginous-based cosmetic is solid and applied by pressure to said first oleaginous barrier strip.

18. The process of claim 16 further comprising heating said oleaginous-based cosmetic to a liquid form and spraying it onto said first oleaginous barrier strip.

19. The process of claim 16 wherein said oleaginous barrier strips are formed on said sheet by spraying oleaginous barrier liuqid onto said flexible sheet.

20. The process of claim 16 wherein said oleaginous barrier strips are formed on said sheet by extruding oleaginous barrier liquid onto said flexible sheet.

21. The process of claim 16 wherein said oleaginous barrier strips are applied to said flexible sheet by contacting said top face of said flexible sheet with a kiss roll soaked with said oleaginous barrier liquid.

22. The process of claim 16 further comprising superimposing oleaginous barrier strips on said first and second oleaginous barrier strips after step (d) and heating and then cooling said superimposed strips.

23. A process for producing a cosmietic sampler, having a plurality of cosmetic samples, which comprises:

(a) applying a first array of parallel and separated oleaginous barrier strips to a flexible sheet having a top and bottom face said first spray of parallel and separated oleaginous barrier strips being applied to a first portion of a said top face of a flexible sheet;

(b) applying a second array of parallel separated oleaginous barrier strips to a second portion of said top face of said flexible sheet;

(c) heating said arrays of oleaginous barrier strips;

(d) cooling said arrays of oleaginous barrier strips;

(e) applying a corresponding array of oleaginous-based cosmetic strips to said first array of oleaginous barrier strips;

(f) applying an adhesive to remaining portions of said top face of said flexible sheet;

(g) folding said flexible sheet so that adhesive applied portions adhere to one another; and (h) selectively scoring the bottom face of said second portion of said flexible sheet thereby creating removable sections on the second portion of said sheet to expose said array of oleaginous-based cosmetic strips.

24. The process of claim 23 further comprising superimposing third and fourth arrays of oleaginous barrier strips respectivelyonto said first and second arrays of oleaginous barrier strips after step (d) and then heating and cooling said superimposed array of strips.

25. A continuous process for making cosmetic samplers, comprising:

(a) applying a first spray of parallel and separated oleaginous barrier strips to a first portion of a top face of a moving web of flexible material having a longitudinal center and a bottom face.

(b) applying a second array of parallel and separated oleaginous barrier strips to a second portion of said top face of said moving web of material, wherein said arrays of strips are applied parallel to said longitudinal center of said moving web and wherein said longitudinal center separates said web into said first and second portions;

(c) heating said array of oleaginous barrier strips;

(d) cooling said spray of oleaginous barrier strips;

(e) applying a correspoinding array of oleaginous-based cosmetic strips onto first spray of oleaginous barrier strips;

(f) applying an adhesive to remaining portions of said moving web;

(g) folding said moving web about said longitudinal center so that adhesive applied portions adhere to one another, and said second array of oleaginous barrier strips overlay said array of oleaginous-based cosmetic strips;

(h) selectively scoring the bottom face of said second portion of said moving web thereby creating removable sections on said second portion to expose said array of cosmetic strips; and (i) cutting said moving web transverse to said longitudinal center at fixed intervals, thereby creating individual cosmetic samplers.

26. A process of producing a cosmetic sampler, which comprises:

(a) applying a first oleaginous barrier strip to a flexible sheet having a top and bottom face, said first oleaginous barrier strip being applied to a first portion of a top face of the flexible sheet;

(b) applying a second oleagious barrier strip to a second portion of said top face of said flexible sheet whereby said first and second barrier strips are parallel and separate;

(c) heating said oleaginous barrier strips;

(d) cooling said oleaginous barrier strips;

(e) applying a strip of an oleaginous-based cosmetic to said first oleaginous barrier strip;

(f) applying a clear plastic strip over the oleaginous-based cosmetic and said first oleaginous barrier strip; and (g) folding said flexible sheet so that said clear plastic strip and second barrie strip face each other.

27. The process of claim 26, wherein said oleaginous-based cosmetic is solid and applied by pressure to said first oleaginous barrier strip.

28. The process of claim 26 further comprising heating said oleaginous-based cosmetic to a liquid form and spraying it onto said first oleaginous barrier strip.

29. The process of claim 26 wherein said oleaginous barrier strips are formed on said sheet by spraying oleaginous barrier liquid onto said flexible sheet.

30. The process of claim 26 wherein said oleaginous barrier strips are formed on said sheet by extruding oleaginous barrier liquid onto said flexible sheet.

31. The process of claim 26 wherein said oleaginous barrier strips are applied to said flexible sheet by contacting said top face of said flexible sheet with a kiss roll soaked with said oleaginous barrier liquid.

32. The processof claim 26 further comprising superimposing oleaginous barrier strips on said first and second oleaginous barrier strips after step (d) and heating and then cooling said superimposed strips.

* * * * *

UNITED STATES PATENT AND TRADEMARK OFFICE
CERTIFICATE OF CORRECTION

PATENT NO. : 4,747,782

DATED : May 31, 1988

INVENTOR(S) : Gaines P. Campbell, Jr.

It is certified that error appears in the above-identified patent and that said Letters Patent is hereby corrected as shown below:

Claim 16, line 4 (column 9, last line), after "sheet" insert --, penetrable by an oleaginous substance,--.

Signed and Sealed this

Twenty-eighth Day of February, 1989

*Attest:*

DONALD J. QUIGG

*Attesting Officer*

*Commissioner of Patents and Trademarks*